No. 651,186. Patented June 5, 1900.
J. HAGUE.
MEANS FOR SECURING PIPES TO WALLS OF BUILDINGS.
(Application filed Mar. 31, 1900.)
(No Model.)

WITNESSES
Charles C. Abbe
Walter Abbe

INVENTOR
John Hague
by his attys.
Howson Howson

UNITED STATES PATENT OFFICE.

JOHN HAGUE, OF ASHTON-UNDER-LYNE, ENGLAND.

MEANS FOR SECURING PIPES TO WALLS OF BUILDINGS.

SPECIFICATION forming part of Letters Patent No. 651,186, dated June 5, 1900.

Application filed March 31, 1900. Serial No. 10,960. (No model.)

*To all whom it may concern:*

Be it known that I, JOHN HAGUE, a subject of the Queen of Great Britain, residing at Adam street, Ashton-under-Lyne, in the county of Lancaster, England, have invented a new and useful Improvement in or Relating to Means for Securing Pipes to the Walls of Buildings, of which the following is a specification.

This invention relates to means for securing cast-iron or other metal pipes which are required to be fixed in a vertical position (or nearly so) either to the inner or outer wall of a brick building. These pipes are ordinarily employed for carrying off rain or waste water or the like and are usually made with a socket at the upper end, into which the lower end of the next pipe above fits. The sockets are each provided with a lug or flange at each side which sets close against the face of the brickwork, and each lug or flange is provided with a round hole, through which nails or holdfasts are driven into the joints of the brickwork to secure the same to the wall, and it is a matter of frequent occurrence that in order to insure the driving of the nail exactly into the joint of the said brickwork it is necessary to raise the lower end of the pipe some distance above the bottom of the socket of the pipe below it, so that the weight of the pipe instead of resting upon the bottom of the socket of the pipe beneath it, as it should, has to be borne by the nails or holdfasts driven into the wall.

The object of my invention is to provide means whereby this defect may be remedied, so that the lower end of each pipe can rest firmly upon the bottom of the socket of the pipe below it at the same time that the nails or holdfasts can always be driven with certainty into the joints between the brickwork, whereby greater economy and other beneficial advantages will be secured, and the pipes will be more firmly held and more secure from a sanitary point of view.

Figure 1:
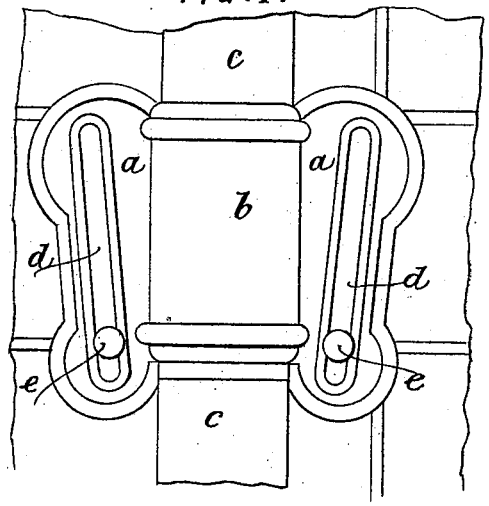
Figure 2:
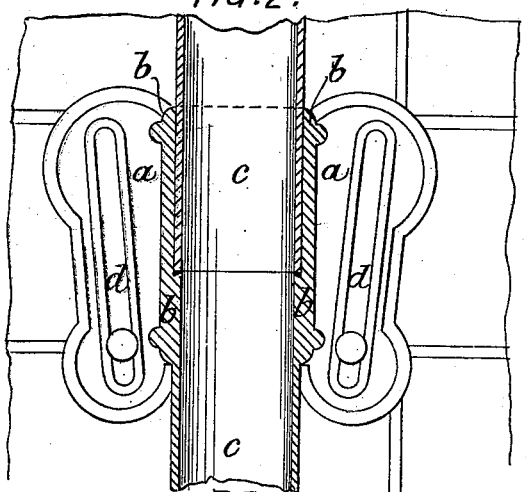
Figure 3:
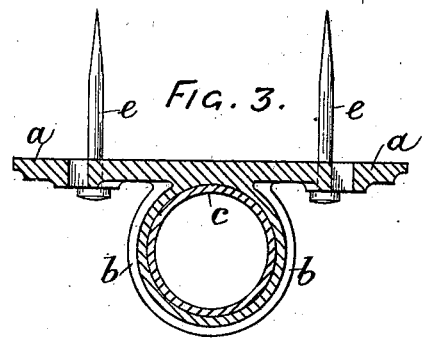
Figure 4:
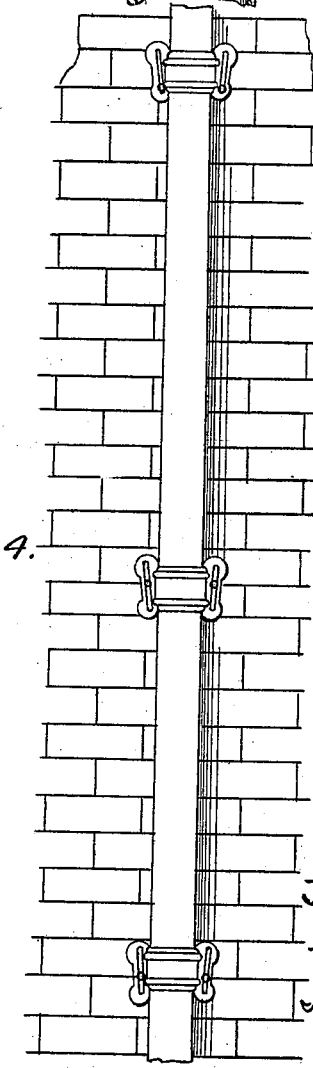

In the accompanying drawings, illustrating my invention, Figure 1 is a front elevation, Fig. 2 a vertical section, and Fig. 3 a horizontal sectional view, of the socketed end of a rain-water or other pipe with part of the spigot end of another pipe inserted therein and supported thereby. Fig. 4 illustrates part of a brick wall, showing how by the use of my invention every nail or holdfast can always be driven with certainty into and between the joints of the brickwork at the same time that the spigot end of one pipe is always firmly supported in the socket end of the one next beneath it.

The invention consists of an iron lug or flange $a$, cast on each side of the socket $b$ of the pipe $c$, which may be either circular, as shown, or square in section. These lugs are made of an elongated form, preferably as shown on the drawings, and in each lug or flange, on each side of the pipe, is left or formed a slot $d$, these said slots not being vertical, but inclined toward each other, as shown, and rather longer than the depth of a brick, so that whatever irregularity there may be either in the brickwork itself or in the length of the pipes it will always be possible to drive a nail or holdfast $e$ through some part of the slot $d$ (as the case may be) directly into the joint between the brickwork, and at the same time the lower or spigot end of each pipe $c$ can be forced home into the socket end $b$ of the pipe below it and rest thereon.

I claim as my invention—

The improved means for securing socketed pipes to the walls of buildings consisting in the combination with the socket of the pipe of two flat lugs or wings each provided with an elongated inclined slot rather longer than the depth of a brick, substantially in the manner and for the purposes hereinbefore described, and as illustrated by the drawings annexed.

In testimony whereof I have signed my name to this specification in the presence of two subscribing witnesses.

JOHN HAGUE.

Witnesses:
 GEO. DAVIES,
 JNO. HUGHES.